United States Patent [19]

Brennan et al.

[11] Patent Number: 5,143,998

[45] Date of Patent: Sep. 1, 1992

[54] HYDROXY-FUNCTIONAL POLY(AMIDE ETHERS) AS THERMOPLASTIC BARRIER RESINS

[75] Inventors: David J. Brennan; Anthony P. Haag; Jerry E. White, all of Midland, Mich.

[73] Assignee: The Dow Chemical Company, Midland, Mich.

[21] Appl. No.: 759,288

[22] Filed: Sep. 13, 1991

Related U.S. Application Data

[60] Continuation-in-part of Ser. No. 660,381, Feb. 26, 1991, Pat. No. 5,089,588, which is a division of Ser. No. 599,212, Oct. 17, 1990, abandoned, which is a continuation-in-part of Ser. No. 344,630, Apr. 27, 1989, abandoned.

[51] Int. Cl.[5] .................... C08G 59/00; C08G 65/08; C08G 65/14
[52] U.S. Cl. ........................................ 528/99; 528/104
[58] Field of Search ................................. 528/99, 104

[56] References Cited

U.S. PATENT DOCUMENTS

| | | | |
|---|---|---|---|
| 3,477,990 | 11/1969 | Dante et al. | 528/104 |
| 3,547,881 | 12/1970 | Mueller et al. | 528/104 |
| 3,725,341 | 4/1973 | Rogers et al. | 528/104 |
| 3,948,855 | 4/1976 | Perry | 528/104 |
| 4,367,328 | 1/1983 | Bertram et al. | 528/98 |
| 4,398,002 | 8/1983 | Bertram et al. | 528/99 |
| 4,410,681 | 10/1983 | Prindle | 528/98 |

Primary Examiner—John C. Bleutge
Assistant Examiner—Frederick Krass

[57] ABSTRACT

Hydroxy-functional poly(amide-ethers) are fabricated into articles such as rigid containers and flexible films exhibiting high barrier to oxygen transmission in both dry and moist environments. For example, a polymer prepared by reacting the diglycidyl ether of 4,4′-isopropylidene bisphenol with α,α′-bis(4-hydroxybenzamido)-1,3-xylene exhibits especially high barrier.

7 Claims, No Drawings

HYDROXY-FUNCTIONAL POLY(AMIDE ETHERS) AS THERMOPLASTIC BARRIER RESINS

CROSS-REFERENCES TO RELATED APPLICATIONS

This application is a Continuation-in-Part of the copending application Ser. No. 660,381, now U.S. Pat. No. 5,089,588, filed Feb. 26, 1991 which is a divisional of copending application Ser. No. 599,212, filed Oct. 17, 1990, now abandoned, which was a continuation-in-part of copending application Ser. No. 344,630, filed Apr. 27, 1989, now abandoned.

BACKGROUND OF THE INVENTION

This invention relates to thermoplastic polymers having pendant hydroxyl moieties and aromatic ether moieties and to articles prepared from such polymers.

Hydroxyphenoxyether polymers are known to be useful in the fabrication of articles exhibiting barrier properties. See, for example, Reinking et al, *J. Poly Sci.*, Vol. 7, pp. 2135–2144, pp. 2145–2152 and pp. 2153–2160 (1963) and *Encyclopedia of Polymer Science and Technology*, Vol. 10, pp. 111–122. Such polymers generally have only moderate oxygen barrier, i.e., they generally exhibit oxygen transmission rates of 2 to 75 cm$^3$-mil/100 in$^2$-atm-day.

In view of the limited barrier properties of the prior art polymers having pendant hydroxyl moieties and phenoxyether moieties, it would be highly desirable to provide a polymer having a genuinely high barrier (i.e., oxygen transmission rate less than 2 cm$^3$-mil/100in$^2$-atm-day) to oxygen. Polymers that retain such high barrier in both dry and moist environments would be especially desirable.

SUMMARY OF THE INVENTION

The present invention is, in one aspect, a normally solid thermoplastic polymer having aromatic ether moieties and amide moieties in the backbone chain and pendant hydroxyl moieties. Surprisingly, the polymer of this invention, hereinafter called a hydroxy-functional poly(amide-ether), exhibits thermoplastic character and excellent barrier to oxygen in both dry and moist environments.

In another aspect, this invention is a container suitable for packaging oxygen-sensitive materials wherein the container is fabricated of the hydroxy-functional poly(amide-ether). In a further aspect, this invention is a substantially impermeable film or coating of the polymer. In yet a further aspect, this invention is a process for preparing the poly(amide-ether) which process comprises contacting a bis(hydroxyarylamido)hydrocarbylene with a diepoxide in the presence of a catalytic amount of an onium salt under conditions sufficient to cause the hydroxyl groups to react with the epoxy groups to form the poly(amide-ether).

In addition to their use as barrier containers and films, the polymers of this invention are also useful as molding, extrusion and casting resins.

DETAILED DESCRIPTION OF ILLUSTRATIVE EMBODIMENTS

Preferably, the hydroxy-functional poly(amide-ether) has repeating units represented by the formula:

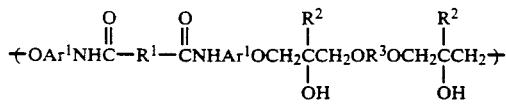

or

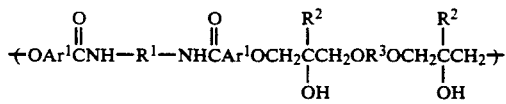

wherein each Ar$^1$ is independently a divalent aromatic moiety, each R$^1$ is a predominantly hydrocarbylene moiety, each R$^2$ is independently hydrogen or a monovalent aliphatic moiety, and each R$^3$ is independently a predominantly hydrocarbylene moiety. "Predominantly hydrocarbylene" is defined as a divalent radical that is predominantly hydrocarbon, but which optionally contains a minor amount of heteroatomic moiety such as oxygen, sulfur, imino, sulfonyl, sulfoxyl and the like.

The hydroxy-functional poly(amide-ethers) of this invention are more preferably those represented by the formula:

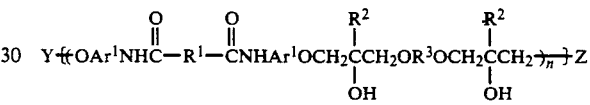

or

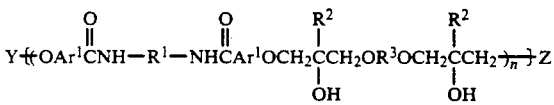

wherein Ar$^1$, R$^1$, R$^2$ and R$^3$ are as defined before, Y is hydrogen or a monovalent organic terminating group, Z is a monovalent organic terminating group, and n is a whole number from 10 to about 1000.

In the more preferred polymers, R$^1$ is a predominantly hydrocarbylene such as (1) alkylene which has from 1 to about 10 carbons which may contain a heteroatomic moiety such oxygen, sulfur, sulfonyl or sulfoxyl and (2) arylene which has from 5 to 25 carbons, may contain a heteroatomic moiety and may be substituted with alkyl, alkoxy, halo, nitro or cycloalkyl groups. R$^2$ is hydrogen or a hydrocarbyl or substituted hydrocarbyl wherein hydrocarbyl is a monovalent hydrocarbon such as alkyl, cycloalkyl, aralkyl, or aryl and the substituent(s) is a monovalent moiety which is inert in the reactions used to prepared the hydroxy-functional poly(amide-ether). R$^3$, while usually different from R$^1$, is similarly a predominantly hydrocarbylene moiety as previously defined. Ar$^1$ is arylene or substituted arylene wherein the substituent may be alkyl, alkoxy, halo, nitro or cyano. Y is hydrogen or

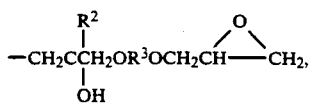

Z is

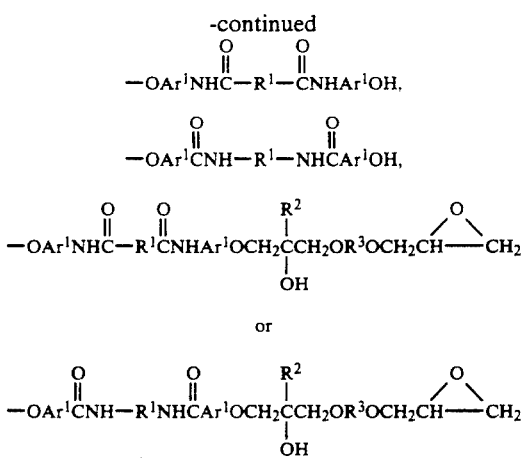

and n is a whole number from 10 to about 1000.

In the most preferred hydroxy-functional poly(amide-ethers), $R^1$ is (1) alkylene having from 1 to 10 carbons such as n-butylene, n-pentylene, n-hexylene, n-octylene; (2) alkyleneoxyalkylene such as ethyleneoxyethylene; (3) alkylenethioalkylene such as ethylenethioethylene or alkylenesulfonylalkylene such as ethylenesulfonylethylene; (4) alkyleneoxyaryloxyalkylene such as ethyleneoxyphenoxyethylene; (5) alkylenearylalkylene such as methylenephenylmethylene; or (6) arylene such as phenylene or substituted arylene such as halophenylene. Of the $R^1$ groups, ethylene, propylene and n-butylene are especially preferred. Most preferably, $R^2$ is hydrogen or alkyl having from 1 to 4 carbons such as methyl, ethyl, propyl and butyl, with hydrogen being especially preferred $R^3$ is most preferably arylene such as phenylene, biphenylene, or naphthenylene; bisphenylenealkylidene such as bisphenyleneisopropylidene, bisphenylenecyanomethane and bisphenylenemethane: bisphenyleneoxide; or bis(phenyleneamido)alkane such as bis(phenyleneamido)butane, bisphenylene sulfide, bisphenylene sulfone, bisphenylene ketone and bisphenylene amide, with bisphenyleneisopropylidene being especially preferred. $Ar^1$ is most preferably phenylene or substituted phenylene wherein the substituent is alkyl, halo or nitro, with phenylene being especially preferred. In the most preferred resins, n is 100–400.

The hydroxy-functional poly(amide-ethers) are preferably prepared by contacting a bis(hydroxyphenylamido)alkane or arene, hereinafter referred to as a dihydroxyl diamide, with a diepoxide under conditions sufficient to cause the aromatic hydroxyl moieties to react with epoxy moieties to form ether linkages, and pendant aliphatic hydroxyl moieties. Surprisingly, under the conditions prescribed herein, the amide moieties do not react with the epoxy groups to form any significant cross-linkages: yet the epoxy groups do react with the aromatic hydroxyl groups to form the poly(amide-ether) having the desired molecular weight. Primarily, this desired result is achieved by the use of an onium catalyst. By "onium" is meant a salt in which the cation is an onium cation such as quaternary ammonium or phosphonium or ternary sulfonium, with phosphonium such as tetrahydro-carbylphosphonium (e.g., tetraalkyl or tetraarylphosphonium) being most preferred. The anion of the onium salt is alkylcarboxylate, or arylcarboxylate halide or hydroxide, with acetate being most preferred. Examples of such onium catalysts include tetramethylammonium acetate and ethyltriphenylphosphonium acetate. Suitable conditions are otherwise as conventionally employed in the reaction of epoxides with phenols to form ether linkages are suitably employed in preparing the resins of this invention. Examples of such suitable conditions are set forth in U.S. Pat. No. 4,647,648, which is hereby incorporated by reference in its entirety. Preferably, however, the poly(amide-ethers) are prepared at temperatures below 200° C., more preferably below 180° C. and most preferably at or below 165° C. In order to insure homogenous reaction mixtures at such temperatures, it is often desirable to use an organic solvent for the reactants such as propylene glycol phenyl ether. Preferred conditions for preparing such resins are set forth in the following working examples.

The dihydroxyl diamide is prepared by a first method which comprises contacting a suitable diacid or diacid halide with a substantial excess of an aminoarenol under conditions sufficient to cause reaction of the amine moieties with the acid halide moieties to form amide moieties. Examples of diacids and diacid halides that are suitably employed include acids and acid halides, preferably chlorides, of the following acids: oxalic, adipic, malonic, succinic, glutaric, fumaric, maleic, pimelic, suberic, azelaic, sebacic, terephthalic, and isophthalic. Examples of aminoarenols suitably employed include the following: aminophenols such as p-aminophenol and m-aminophenol, aminonaphthols and other aminohydroxyarenes. Conditions conventionally employed for the reaction of acid chlorides with amines to form amides are suitably employed to form the dihydroxyl diamides of this invention. Examples of such suitable conditions are set forth according to J. Preston, *J. Polym. Sci.*, Vol. 8, p. 3135–3144(1970). Preferred conditions for preparing the dihydroxyl diamides are set forth hereinafter in the working examples.

The dihydroxyl diamide can also be prepared by a second method which comprises contacting a suitable diamine with a hydroxybenzoic acid derivative such as a hydroxybenzoic acid ester, an acetoxybenzoyl halide or acetoxybenzoic acid, under conditions sufficient to cause reaction of the amine group with the carboxylic acid or carboxylic acid derivative to form amide moieties, followed by removal of the acetyl group in the case of the acetoxy species. Examples of diamines that are suitably employed include ethylene diamine, 1,3-propanediamine, 1,4-butanediamine, 1,5-pentanediamine, hexamethylenediamine, 1,3-phenylenediamine, 1,4-phenylenediamine and m-xylylenediamine. Examples of hydroxybenzoic acid derivatives that can be used include methyl 4-hydroxybenzoate, ethyl 4-hydroxybenzoate, phenyl 4-hydroxybenzoate, methyl salicylate, phenyl salicylate, 4-acetoxybenzoyl chloride, 4-acetoxybenzoic acid, and other derivatives of carboxyhydroxyarenes. Preferred conditions for preparing the dihydroxyldiamides are set forth hereafter in the working examples. Using this dihydroxyl diamide in preparing a hydroxy-functional poly(amide-ether) results in the reversal of the amide linkages in the polymer backbone. (i.e., the carbonyl, instead of the nitrogen, of the amide group is now attached to the arylene ring portion of the backbone). When compared with the hydroxy-functional poly(amide-ethers) prepared from the dihydroxy diamide of the first method, the hydroxyfunctional poly(amide-ethers) prepared from the dihydroxy diamide of the second method have comparable barrier properties but better glass transition temperatures. For example, Sample No. 2c in Table II has an oxygen transmission rate of 1.27 cc-mil/100 in²-atm-day and a glass transition temperature of 126° C. A similarly prepared sample from a hydroxy-functional poly(amide-ether) prepared from the dihydroxy diamide of the first method has an oxygen transmission rate of 1.27 cc-mil/100 in²-atm-day and a glass transition temperature of 112° C.

Examples of preferred diepoxides include the diglycidyl ethers of dihydric phenols such as 4,4'-isopropylidene bisphenol (Bisphenol A), 4,4'-dihydroxydiphenylethylmethane, 3,3'-dihydroxydiphenyldiethylmethane, 3,4'-dihydroxydiphenylmethylpropylmethane, bisphenol, 4,4'-dihydroxydiphenyloxide, 4,4'-dihydroxydiphenylcyanomethane, 4,4'-dihydroxybiphenyl, 4,4'-dihydroxybenzophenone, 4,4'-dihydroxydiphenyl sulfide, 4,4'-dihydroxydiphenyl sulfone, 2,6-dihydroxynaphthalene, 1,4-dihydroxynaphthalene, hydroquinone, resorcinol, catechol and other dihydric phenols listed in U.S. Pat. Nos. 4,438,254 and 4,480,082 which are hereby incorporated by reference.

The barrier containers, films and coatings of this invention are fabricated from the poly(amide-ether) using conventional fabricating techniques for normally solid, thermoplastic polymers such as extrusion, compression molding, injection molding and similar fabrication techniques commonly employed to produce such articles.

The following working examples are given to illustrate the invention and should not be construed as limiting its scope. Unless otherwise indicated, all parts and percentages are by weight.

EXAMPLE 1

A. Preparation of N,N'-Bis(m-hydroxyphenyl)adipamide

A solution of adipoyl chloride (5.5 g, 0.03 mole) in dry tetrahydrofuran (THF, 50 mL) is added dropwise to a magnetically stirred solution of m-aminophenol (13.0 g, 0.12 mole) in 150 ml of THF. A precipitate forms after 10–15 minutes and is collected by filtration and then washed with water and then with a mixture of water and tetrahydrofuran and recrystallized from an ethanol/water mixture. Analysis of the resulting 8.86 g of white solid indicates it to have the following structure:

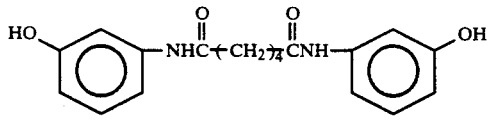

Several additional bis(hydroxyphenyl)amides are prepared using the foregoing procedure, m-aminophenol and different diacid chlorides. The resulting amides are then employed according to the following procedure to make the desired hydroxy-functional poly(amide-ethers). These polymers are then evaluated for barrier properties and the results are reported in Table I.

B. Preparation of Hydroxy Poly(amide-ethers)

A 10.5-g (31.98 mmoles) portion of the adipamide of Part A and diglycidyl ether of Bisphenol A (DGBA) (11.26 g, 32.62 mmoles, epoxy equivalent weight of 172.58) in 13 mL of freshly distilled propylene glycol phenylether are heated with stirring to 140° C.–150° C. under a nitrogen atmosphere. The diglycidyl ether is recrystallized from methanol twice before use. About 15–20 drops of ethyltriphenylphosphonium acetate (70 percent in methanol) are added as the catalyst and, after a brief induction period, the temperature of the reaction rises to 160° C.–170° C. with complete dissolution of the monomers. Upon the resultant rapid increase in viscosity of the solution, additional catalyst and solvent are added to progress the reaction to completion and to maintain effective stirring. The reaction solution is maintained at 150° C.–160° C. for 20 minutes and then cooled to 100° C. and diluted with 25 mL of dimethylformamide (DMF). The resulting solution is poured into a rapidly stirred 1:1 methanol/water mixture (400–600 mL) to precipitate the product which is then redissolved in DMF (50 mL) and reprecipitated from the methanol/water mixture. The product is dried in vacuo at 90° C. for 48 hours to yield 15.1 g (70 percent yield) of a poly(amide-ether) (ηinh =0.65 dL/g in DMF at 25° C. and 0.5 g/dL) which is represented by the formula:

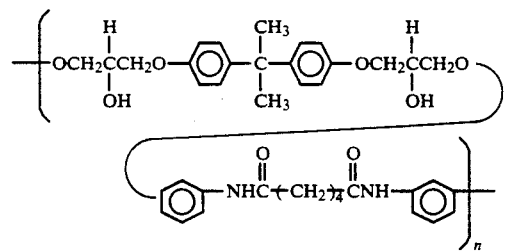

Several additional hydroxy-functional poly-(amide-ethers) are prepared using the foregoing procedure and the didhydroxyamides and diepoxides corresponding to moieties shown for R¹, R³ and Ar¹ in Table I. These polymers are generally represented by the following structural formula:

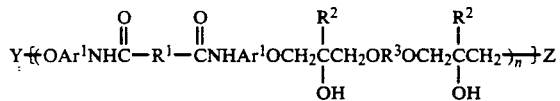

wherein Ar¹, R¹, and R³ are as defined in Table I, Y is hydrogen, Z is

and n is in range of 200 to 400 and R² is hydrogen.

C. Barrier Testing

Specimens (10 cm × 10 cm × 0.013 cm) for oxygen barrier evaluations are prepared by compression molding samples (3.5 g) of the polymer of Part B between Teflon sheets in a brass template at 200° C. at 500 psi (3.5 mPa) for 8–10 minutes, then at 40,000 psi (275 mPa) for 2–4 minutes and then cooled at 40,000 psi for 10 minutes. Oxygen transmission rates are then measured for the samples and the results are reported in Table I.

Following the foregoing procedures, several other hydroxy-functional poly(amide-ethers) within the scope of this invention are similarly prepared and tested and the results are also recorded in Table I.

TABLE I[1]

| Sample No. | Composition[1] R¹ | R³ | Ar¹ | $\eta$inh[2] (dL/g) | Tg[3] (°C.) | OTR[4],[5] Temp (°C.) | <8% RH[6] | 70-90% RH[6] |
|---|---|---|---|---|---|---|---|---|
| 1 | —(CH₂)₄— | —C₆H₄—C(CH₃)₂—C₆H₄— | —C₆H₄— | 0.65 | 103 | 23.3 | 1.24 | 0.79 |
| 2 | —(CH₂)₄— | —C₆H₄—C(CH₃)₂—C₆H₄— | —C₆H₄— | 0.72 | 112 | 24.4 | ND | 1.2 |
| 3 | —(CH₂)₁₀— | —C₆H₄—C(CH₃)₂—C₆H₄— | —C₆H₄— | 0.52 | 91 | 23.4 | ND | 3.34 |
| 4 | m-C₆H₄— | —C₆H₄—C(CH₃)₂—C₆H₄— | —C₆H₄— | 0.30 | 140 | 24.2 | ND | 1.15 |
| 5 | —(CH₂)₄— | —C₆H₄—CH₂—C₆H₄— | —C₆H₄— | 0.43 | 92 | 23.1 | ND | 0.45 |
| 6 | —(CH₂)₄— | —C₆H₄—S—C₆H₄— | —C₆H₄— | 0.51 | 94 | 23.6 | ND | 0.45 |
| 7 | —(CH₂)₄— | —C₆H₄—SO₂—C₆H₄— | —C₆H₄— | 0.46 | 93 | 23.1 | ND | 0.47 |
| 8 | —(CH₂)₄— | —C₆H₄—C₆H₄— | —C₆H₄— | 0.45 | 110 | 23.4 | 0.50 | 0.28 (0.13)* |
| 9 | —(CH₂)₄— | —C₆H₄— | —C₆H₄— | 0.63 | 97 | 23.6 | 0.35 | 0.19 |
| 10 | —(CH₂)₄— | —C₆H₄—C(=O)—C₆H₄— | —C₆H₄— | 0.54 | 113 | 23.3 | ND | 0.26 |
| 11 | —(CH₂)₄— | —C₆H₄—CH(CN)—C₆H₄— | —C₆H₄— | 0.49 | 98 | 23.4 | ND | 0.57 |
| 12 | —(CH₂)₄— | naphthalene-2,6-diyl | —C₆H₄— | 0.65 | 109 | 23.7 | ND | 0.18 |
| 13 | —(CH₂)₄— | —C₆H₄—C(CF₃)₂—C₆H₄— | —C₆H₄— | 0.63 | 97 | 23.6 | 0.35 | 0.19 |

TABLE I-continued

| Sample No. | Composition R¹ | R³ | Ar¹ | $\eta_{inh}$ (dL/g) | Tg (°C.) | OTR Temp (°C.) | <8% RH | 70-90% RH |
|---|---|---|---|---|---|---|---|---|
| 14 | $-\!\!+\!\!CH_2\!\!+\!\!_4$ | (naphthyl) | (phenyl) | 0.54 | 108 | 23.7 | ND | 0.38 |
| 15 | $-\!\!+\!\!CH_2\!\!+\!\!_4$ | (phenyl) | (phenyl) | 0.55 | 97 | 23.7 | ND | 0.19 |
| 16 | $-\!\!+\!\!CH_2\!\!+\!\!_4$ | (phenyl) | (phenyl) | 0.40 | 78 | 23.7 | ND | 0.24 |

① $R^2$ is hydrogen
② $\eta_{inh}$ — inherent viscosity in DMF at 0.5 g/dL and 25° C.
③ Tg — glass transition temperature
④ ASTM Method D-3985 measured for compression molded films
⑤ Oxygen transmission rate (OTR) measured in cc/mil/100 in²/atm/day
⑥ Relative humidity of the oxygen stream
*After annealing at 270° C. for 24 hours As evidenced by the data shown in Table I, the polymers of this invention exhibit excellent barrier to oxygen transmission in a wet environment as well as in a dry environment.

EXAMPLE 2

A. Preparation of α,α'-bis(4-hydroxybenzamido)-1,3-xylene

A solution of m-xylylenediamine (10.22 g, 0.0750 mol) and triethylamine (30.4 g, 0.30 mol) in dry THF (50 mL) is added to a mechanically stirred solution of 4-acetoxybenzoyl chloride (29.79 g, 0.15 mol) in dry tetrahydrofuran (300 mL) which causes a precipitate to form immediately. Upon completion of addition, the mixture is stirred for 16 hours at 25° C., then the precipitated solid is collected by filtration. The solid is washed with water and is treated with 35 mL of 5N NaOH (0.175 mol) in 400 mL of boiling 1:1 ethanol/water for two hours. The solution is acidified with 15 mL of concentrated HCl and allowed to cool, which causes a white solid to form. The solid is recrystallized twice from an ethanol/water mixture to yield 20.8 g of a white solid that is analyzed by proton and carbon-13 NMR spectroscopy and determined to have the following structure:

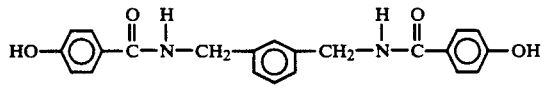

Several additional bis(hydroxyphenyl) amides are prepared using the foregoing procedure, using other diamines in place of m-xylylenediamine. The resulting amides are then employed according to the following procedure to make the desired hydroxy-functional poly(amide-ethers). These polymers are then evaluated for barrier properties following the procedure of Example I, Part C and the results are reported in Table II.

B. Preparation of Hydroxy Poly(amide-ethers)

A 7.53 g (20.00 mmol, 40.00 meq phenolic groups) portion of the dihydroxydiamide of Part A, diglycidyl ether of Bisphenol A (DGBA) (EEW=171.1) (6.98 g, 40.80 meq epoxide) and Dowanol PPH (15 mL) are added to a 100 mL polymerization reactor, which is then fitted with a thermometer, overhead mechanical stirrer shaft, and nitrogen inlet and outlet adapters. The mixture is heated to 140° C. and 15 drops of A-1 catalyst is added. The temperature of the reaction mixture rises to 145° C. and is maintained at 155 to 165° C. as the solution becomes increasingly viscous over a 10 to 15 minute period. Dowanol PPH (10-20 mL) is added as the solution reaches maximum viscosity and is maintained at 155° C. for several minutes. The solution is cooled to 120° C. and DMF is added to dilute the solution to a volume of 100 mL. When the polymeric materials dissolve, the solution is precipitated into a solution of 3:1 methanol/water (400 mL), then is washed with methanol (300 mL) followed by the addition of water (100 mL) in a high speed blender. The white granular polymer is collected by filtration, air dried, then redissolved in THF (100 mL). The polymer is precipitated a second time as described previously, then dried in vacuo at 80° C. for 24 hours to yield 12.2 g (84% yield) of a poly(amide-ether) having the following properties: inherent viscosity ($\eta_{inh}$): 0.44 dL/g in DMF at 25° C. and 0.5 g/dL); glass transition temperature (Tg): 129° C.; oxygen transmission rate (OTR): 1.43 cc-mil/100 in²-atm-day at 59–61% RH of $O_2$: and which is represented by the formula:

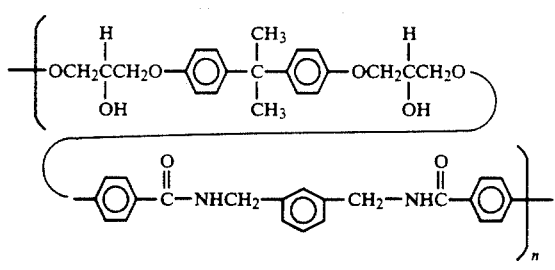

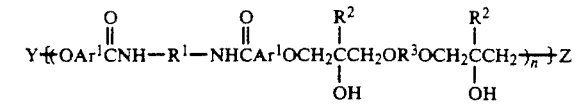

wherein $Ar^1$, $R^1$ and $R^3$ are as defined in Table III, Y is hydrogen, Z is

and n is in the range of 200 to 400 and $R^2$ is hydrogen.

Several additional hydroxy-functional poly(amide-ethers) are prepared using the foregoing procedure and the dihydroxyamides and diepoxides corresponding to the moieties shown for $R^1$, $R^3$ and $Ar^1$ in Table II. These polymers are generally represented by the following structural formula:

Following the foregoing procedures, several other hydroxy-functional poly(amide-ethers) within the scope of this invention are similarly prepared and tested and the results are also recorded in Table II.

TABLE II

| Sample No. | $R^1$ | $R^3$ | $Ar^1$ | Tg (°C.) | $\eta inh$ (dL/g)[a] | OTR (DU)[b,c] | RH (%)[d] |
|---|---|---|---|---|---|---|---|
| 2a | $+(CH_2)_2$ | bisphenol-A | phenyl | 133 | 0.49 | 1.35 | 63–65 |
| 2b | $+(CH_2)_3$ | bisphenol-A | phenyl | 112 | 0.41 | 0.95 | 69–82 |
| 2c | $+(CH_2)_4$ | bisphenol-A | phenyl | 126 | 0.49 | 1.27 | 63–65 |
| 2d | $+(CH_2)_5$ | bisphenol-A | phenyl | 110 | 0.44 | 1.74 | 59–63 |
| 2e | $+(CH_2)_6$ | bisphenol-A | phenyl | 111 | 0.49 | 1.95 | 58–60 |
| 2f | $CH_2$–phenyl–$CH_2$ | bisphenol-A | phenyl | 129 | 0.44 | 1.43 | 59–61 |
| 2g | phenyl | bisphenol-A | phenyl | 152 | 0.44 | 1.45 | 78–86 |
| 2h | $-CH_2-CH(OH)-CH_2-$ | bisphenol-A | phenyl | 129 | 0.56 | 0.96 | 58–60 |

[a] Concentration of 0.5 g/100 mL in DMF at 25.0° C.
[b] ASTM method D3985-81
[c] Oxygen transmission rate (OTR) in cc-mil/100 in²-atm-day
[d] Relative Humidity (RH) of oxygen As evidenced by the data in Table II, the polymers of this invention exhibit good barriers to oxygen.

What is claimed is:

1. A thermoplastic polymer having excellent barrier to oxygen in both dry and moist environments and having repeating units represented by the formula:

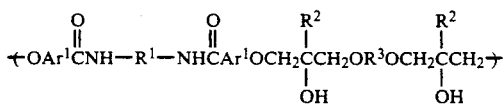

wherein each $Ar^1$ is independently a divalent aromatic moiety, each $R^1$ is a predominantly hydrocarbylene moiety, each $R^2$ is independently hydrogen or a monovalent aliphatic moiety, and each $R^3$ is independently a predominantly hydrocarbylene moiety.

2. The polymer of claim 1 which is represented by the formula:

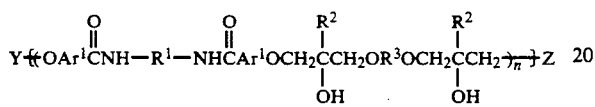

wherein $Ar^1$, $R^1$, and $R^2$ and $R^3$ are as defined in claim 1, Y is a hydrogen or a monovalent organic terminating group, Z is a monovalent organic terminating group, and n is a whole number from 10 to about 1000.

3. The polymer of claim 2 wherein $R^1$ is (1) an alkylene moiety which has from 1 to about 10 carbons or a heteroalkylene which contains an alkylene group and a heteroatomic moiety which is oxygen, sulfur, sulfonyl or sulfoxyl or (2) an arylene which has from 5 to 25 carbons or heteroarylene which contains an arylene ring wherein the ring is interrupted with a heteroatomic moiety provided that the arylene group is optionally substituted with alkyl, alkoxy, halo, nitro or cyano, $R^2$ is hydrogen or a hydrocarbyl or substituted hydrocarbyl wherein the substituent(s) is a monovalent moiety which is inert in the reactions used to prepare the polymer, and $R^3$ is an alkylene which has from 1 to about 10 carbons or a heteroalkylene which contains an alkylene group and a heteroatomic moiety which is oxygen, sulfur, sulfonyl or sulfoxyl or (2) an arylene which has from 5 to 25 carbons or heteroarylene which contains an arylene ring wherein the ring is interrupted with a heteroatomic moiety, $Ar^1$ is arylene or substituted arylene wherein the substituent is alkyl, alkoxy, halo, nitro or cyano, Y is hydrogen or

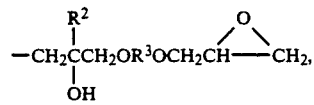

and Z is

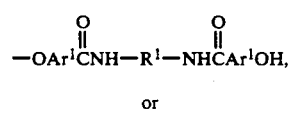

or

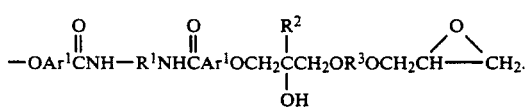

4. The polymer of claim 3 wherein $R^1$ is ethylene, $R^2$ is hydrogen, $R^3$ is bisphenyleneisopropylidene, $Ar^1$ is p-phenylene, Y is hydrogen, and n is a number from 200 to 1000.

5. The polymer of claim 1 in the form of a barrier container.

6. The polymer of claim 1 in the form of a barrier film.

7. The polymer of claim 1 in the form of a barrier coating.